July 25, 1967  R. T. BURNETT  3,332,521
CLOSED LOOP TYPE DISC BRAKE
Filed Aug. 11, 1965  2 Sheets-Sheet 1

INVENTOR.
RICHARD T. BURNETT
BY
Sheldon F. Raizes
ATTORNEY

INVENTOR.
RICHARD T. BURNETT
BY
Sheldon F. Raizes
ATTORNEY

United States Patent Office 3,332,521
Patented July 25, 1967

3,332,521
CLOSED LOOP TYPE DISC BRAKE
Richard T. Burnett, South Bend, Ind., assignor to The Bendix Corporation, South Bend, Ind., a corporation of Delaware
Filed Aug. 11, 1965, Ser. No. 478,824
5 Claims. (Cl. 188—73)

This invention relates to a disc brake.

More particularly, this invention relates to a floating caliper disc brake.

An object of this invention is to construct a disc brake having self energization.

Another object of this invention is to provide a disc brake with self energization wherein the effective applying effort is decreased as brake lining wears so that the same applying force is required for a given torque throughout the life of the lining.

Figure 1:
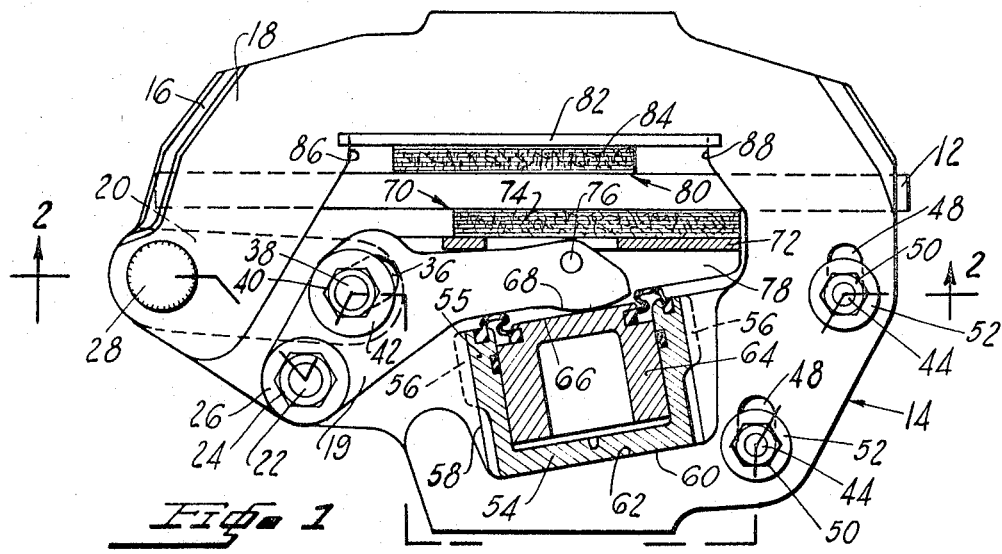
Figure 2:
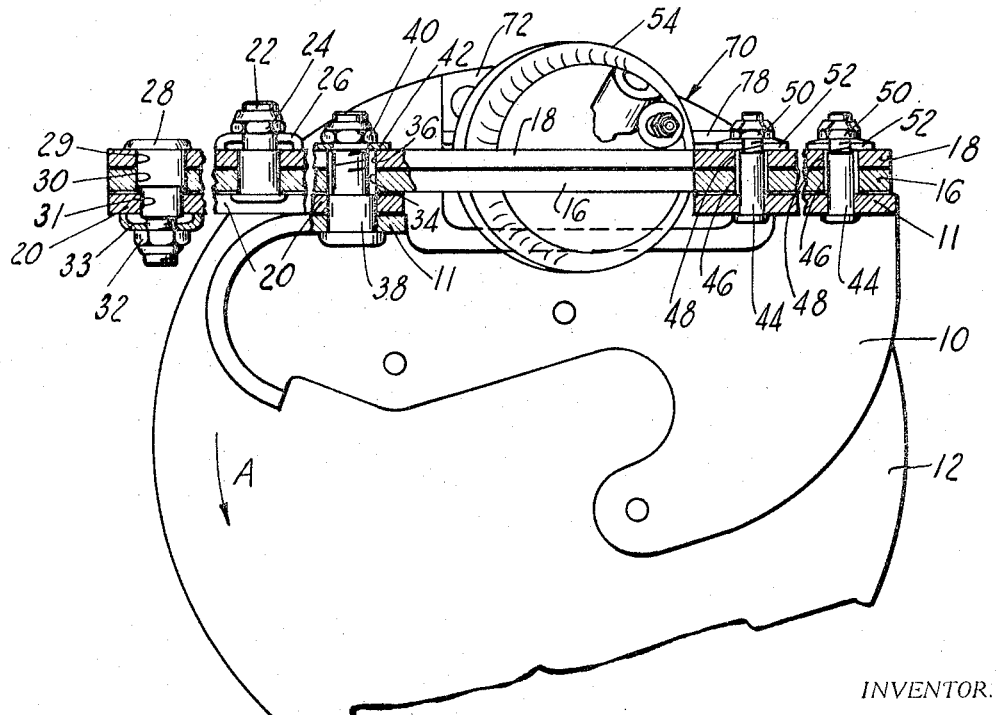
Figure 3:
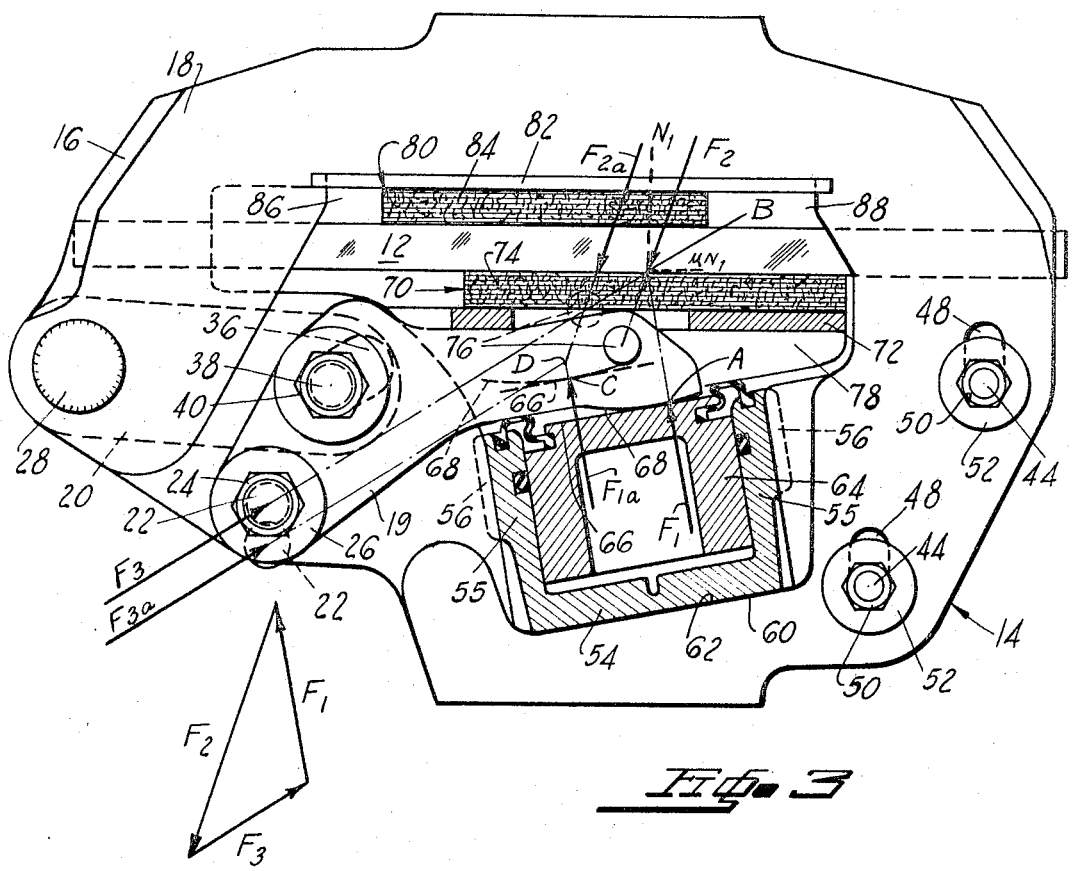
Figure 4:
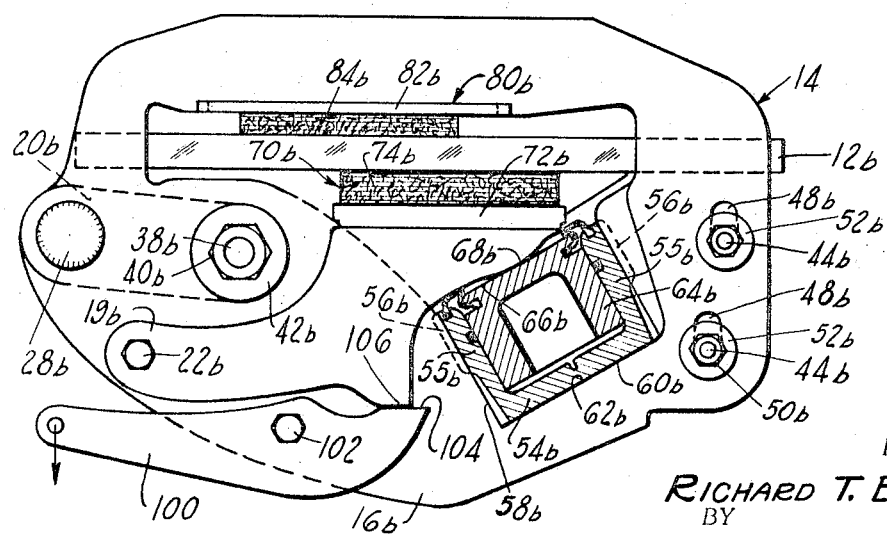

Other objects will become apparent from the following description with reference to the drawings wherein:

FIGURE 1 is a plan view of a brake assembly;
FIGURE 2 is a view taken along section line 2—2 of FIGURE 1;
FIGURE 3 is the same view as FIGURE 1 illustrating the forces acting on one shoe; and
FIGURE 4 is a modification of the brake assembly of FIGURE 1.

Referring to FIGURES 1 and 2, a support member 10 extends along one side of a disc 12 and is secured to a stationary part of a vehicle such as an axle flange (not shown). A caliper cage 14 comprises closed loop stamping 16, which embraces the disc 12, and a reinforcing stamping 18 welded to and lying on top of stamping 16. The stamping 16 is not closed in order to leave a space in which an applying lever 19 is received. The applying lever 19 is pivotally secured to the cage 14 by a stud 22, nut 24 and washer 26 assembly. A stud 28 extends through openings 29, 30 and 31 in the stampings 18, 16 and a link 20, respectively, and in conjunction with a nut 32 and washer 33 pivotally securing the stampings 16, 18 to the link. The stamping 16 and the applying lever 19 have oversized slots 34 and 36, respectively, which receive an anchor bolt 38 therethrough. The anchor bolt 38 also extends through an opening in a flange 11 on the support member 10 and an opening in the link 20 and in conjunction with a nut 40 and washer 42 secures the link 20 to the support flange 11. The edge of the slots 34 and 36 do not engage the anchor bolt 38 at any time. The link 20 anchors on the anchor bolt 38. A pair of studs 44 extends through an opening on the flange 11 and elongated oversized slots 46, 48 in the stampings 16 and 18, respectively, and in conjunction with a corresponding nut 50 and washer 52 secure and guide the cage 14 on the support flange 11. The edges of the openings 46 and 48 do not engage the stud 44 at any time and therefore do not transmit torque thereto.

A wheel cylinder housing 54 includes a pair of ears 55 on diametrically opposite sides thereof each of which has a slot 56 for receiving an edge 58 of a recess in the stamping 16. The wheel cylinder housing 54 is fitted into the recess with the closed end 60 thereof abutting the edges 62 of the stampings 16 and 18 to provide a thrust relationship therebetween. A piston 64 is slidably received in the housing 54 and has a flat face 66 engaging a curved surface 68 on the lever 19. A brake shoe 70 comprising a backing plate 72 and friction lining 74 is pivotally attached to the lever 19 by a pin 76 which extends through a flange 78 on the backing plate 72. A second brake shoe 80, comprising a backing plate 82 and friction lining 84 secured thereto, carried by the cage 14 for movement therewith is connected to the plate by a well known tongue and groove construction with the edges 86 and 88 being received in slots in the backing plate 82.

In operation, assuming rotation of the disc 12 in the direction of Arrow A, fluid pressure introduced into the cylinder housing 54 will thrust piston 64 and thereby the lever 19 and shoe 70 in a direction toward the disc 12 until the shoe engages the disc 12. Hydraulic reaction will then thrust the cylinder housing 54 away from the disc 12 thereby shifting the cage 14 in the same direction to pull shoe 80 into engagement with the disc 12. The torque exerted on the shoe 70 will be transmitted through pin 76, lever 19, stamping 16 and stud 28 to the link 20 which, in turn, transfers the torque through anchor bolt 38 to the support plate 10. The torque exerted on the shoe 80 will be transmitted through the cage 14, stud 28, link 20 and stud 38 to the support plate 10. It should be noted that due to the lever 19, the brake is self energizing during braking when the disc is rotating in the direction of Arrow A since the disc tends to carry the shoe 70 to the left and thus wedge the shoe 70 between the link 19 and the disc 12. This wedging action will force the link to react on the cage 14 exerting a thrust on the cage 14 to bring shoe 70 into engagement with the disc 12. Thus, the action of the link which effects engagement of the brake shoes with the disc is in addition to the hydraulic force applied. Due to the self energization action, a smaller applying force is required than for a brake without self energization.

As the brake linings wear, the moment arm between the shoe 70 and stud 22 increases thereby increasing the self energization effect of the link 19. To compensate for the increase in self energization effect, the realtionship of the curved edge 68 on the link 19 and flat surface 60 on the piston 64 effects a reduction in the effect of the hydraulic applying force. This is accomplished since the contact point between the piston face 66 and the edge 68 is shifted closer to the pivoting point (stud 22) of the link 19, as the brake lining 74 wears, thereby resulting in shifting of the path of the hydraulic applying force closer to the pivoting point 22 of the link 19. The curved surface 68 on lever 19 and the piston face 66 may be arranged that the same applying effort will be required for the same desired braking output regardless of the friction lining wear. This feature is illustrated by the force diagrams in FIGURE 3. The forces acting on the assembly of the shoe 70 and lever 19 are:

$F_1$=the applying force exerted by the piston 64
$N_1$=the normal force exerted by the disc 12
$\mu N_1$=the frictional force exerted by the disc 12
$F_2$=the resultant force of $N_1$ and $\mu N_1$
$F_3$=the force exerted on the lever 19 by the stud 28

Assume no lining wear:

The piston 64 will engage the lever 19 at point A. The path of $F_1$ must pass through point A. The path of $F_2$ must pass through pin 76. The paths of $F_1$ and $F_2$ intersect at point B. Since the paths of $F_1$ and $F_2$ are determined, the path of $F_3$ must pass through the intersection of the paths of $F_1$ and $F_2$ or point B. A force triangle illustrates the relative values of $F_1$, $F_2$ and $F_3$. Assuming that the lining has worn out, the surface 68, pin 76, and stud 28 will change to positions designated by the same reference numerals with an $a$ affixed thereto. The same forces will also be designated with an $a$ affixed thereto. In the lining worn out position, the piston face 66 will engage the curved surface 68 of lever 19 at point C. The path of $F_{1a}$ and $F_{2a}$ intersect at point D and therefore the path of $F_{3a}$ must pass through point D. $F_{1a}$, $F_{2a}$ and $F_{3a}$ are parallel to $F_1$, $F_2$, and $F_3$, respectively, and therefore form the same force triangle. The corresponding forces will remain parallel throughout the life of the brake lining 74 and, therefore, the same magnitude of applying force $F_1$ will effect the same braking torque throughout the lining life.

The above characteristic will also be true if the lever 19 was pivoted directly on the support rather than on the cage 14. The curved edge 68 on the link would have to be modified since the pivot point of the link 19 remains stationary as the lining 74 wears.

FIGURE 4 illustrates a portion of the same brake assembly as FIGURE 1 with the same elements being designated by the same reference numerals with a *b* affixed thereto. The assembly is the same only a mechanically actuated lever 100 has been added thereto for parking or emergency actuation. The lever 100 is pivotally mounted on the stamping 16*b* by a pin 102. A cam surface 104 is located on the lever 100 and engages a projection 106 on the applying lever 19*b* to actuate the same upon rotation of the lever 100.

While the invention has been described in considerable detail, it is my intention to include all equivalent modifications within the scope of the following claims.

I claim:

1. In a disk brake: a rotor having a pair of opposed annular braking surfaces thereon, a stationary support member opposite one side of said rotor, a housing, said housing including a first portion extending opposite of and generally chordally of one of said braking surfaces, a second portion extending opposite of and generally chordally of the other of said braking surfaces, and circumferentially spaced portions extending transversely across the periphery of said rotor interconnecting said first and second portions, actuating means carried by said housing, a link extending opposite said one braking surface in the same general chordal direction as said first and second portions of said housing, means securing one end of said link to said support member for pivotal movement about an axis which is generally perpendicular to the general chordal plane in which said first and second portions of said housing extend, means pivotally mounting said housing on the other end of said link about an axis which is generally parallel to the axis about which said link pivots, whereby said housing is reciprocably movable in a direction which is generally perpendicular to the plane of said braking surface, a self energizing link, said self energizing link being pivotally mounted at one end on said housing, a first friction member operatively connected to the other end of said self energizing link for movement therewith into engagement with one of said braking surfaces, a second friction member carried by said housing for movement into engagement with the other of said braking surfaces, said actuating means and said self energizing link having abutting thrust surfaces, one of said thrust surfaces being curved and the other of said thrust surfaces being substantially flat, said abutting surfaces being arranged to progressively change the location of contact between said thrust surfaces in a circumferential direction toward the pivoting point at said one end of said self energizing link as said friction members wear.

2. The structure as recited in claim 1 wherein said actuating means comprises a fluid actuated piston having said flat thrust surface thereon and said link has said curved thrust surface abutting said piston thrust surface.

3. In a disk brake: a rotor having a pair of opposed annular braking surfaces thereon, a stationary support member opposite one side of said rotor, a housing, said housing including a first portion extending opposite of and generally chordally of one of said braking surfaces, a second portion extending opposite of and generally chordally of the other of said braking surfaces, and circumferentially spaced portions extending transversely across the periphery of said rotor interconnecting said first and second portions, actuating means carried by said housing, a link extending opposite said one braking surface in the same general chordal direction as said first and second portions of said housing, an anchor member secured to said support member and extending in a direction which is generally perpendicular to the general chordal plane in which said first and second portions of said housing extend, said link being pivotally secured at one end to said anchor member, means pivotally mounting said housing on the other end of said link about an axis which is generally parallel to the axis about which said link pivots, whereby the whole housing is reciprocably movable in a direction which is generally perpendicular to the plane of said braking surfaces, a self energizing link located opposite said one braking surface, said self energizing link being pivotally mounted at one end on said housing, a first friction member pivotally mounted on the other end of said self energizing link for movement therewith into engagement with one of said braking surfaces, a second friction member carried by said housing for movement into engagement with the other of said braking surfaces, said actuating means being effectively connected to said self energizing link for exerting an applying thrust thereon and thereby on said first friction member for effecting movement of said housing to bring said second friction member into engagement with its respective braking surface.

4. The structure is recited in claim 3 wherein an elongated opening is in said self-energizing link, said anchor member extends through said opening, said opening is oversized relative to said anchor member to clear the edge of said opening from said anchor member at all times.

5. A disc brake comprising:
   a housing;
   an actuating means mounted to said housing;
   a link pivotally mounted to said housing and slidably connected to said actuating means by abutting a thrust surface of the link with a thrust surface of the actuating means, which thrust surfaces are adapted to progressively change the location of the contact therebetween in a circumferential direction toward the pivot point of the pivotal mounting of said link to said housing;
   a friction member;
   a means to pivotally mount said friction member to said link adjacent the opposite surface thereof with respect to said thrust surface such that the same applying force to the point of contact between the actuating means and the link from the actuating means will have the same resulting force that is a component of the normal force and the frictional force exerted by the friction member and acting through the means pivotally mounting said friction member to said link regardless of the pivoting of said link;
   an anchor member operatively connected to said link to permit the pivoting thereof while maintaining said link in the plane of said housing; and
   a torque link affixed to said anchor member and to said housing for transferring the torque of said friction member to a support structure for said housing.

References Cited

UNITED STATES PATENTS

| | | | |
|---|---|---|---|
| 3,088,554 | 5/1963 | Desvignes et al. | 188—73 |
| 3,150,745 | 9/1964 | Eksergian | 188—73 |
| 3,199,634 | 8/1965 | Chouings | 188—73 |

MILTON BUCHLER, *Primary Examiner.*

G. E. HALVOSA, *Assistant Examiner.*